United States Patent [19]

Kosco

[11] Patent Number: 5,434,516
[45] Date of Patent: Jul. 18, 1995

[54] AUTOMATIC SCSI TERMINATION CIRCUIT

[75] Inventor: Michael T. Kosco, Mission Viejo, Calif.

[73] Assignee: Future Domain Corporation, Irvine, Calif.

[21] Appl. No.: 89,967

[22] Filed: Jul. 9, 1993

[51] Int. Cl.6 ............................................. H03K 17/16
[52] U.S. Cl. ...................................... 326/30; 327/545; 326/86
[58] Field of Search ..................... 307/475, 443, 296.5; 326/86, 90, 30

[56] References Cited

U.S. PATENT DOCUMENTS

| | | | |
|---|---|---|---|
| 4,920,339 | 4/1990 | Friend | 340/825 |
| 5,029,284 | 7/1991 | Felbaumer | 307/475 |
| 5,099,137 | 3/1992 | Lattin, Jr. | 307/147 |
| 5,239,559 | 8/1993 | Brach | 307/547 |
| 5,313,595 | 5/1994 | Lewis | 307/443 |

Primary Examiner—Edward P. Westin
Assistant Examiner—Andrew Sanders
Attorney, Agent, or Firm—Christie, Parker & Hale

[57] ABSTRACT

An automatic SCSI termination circuit has means detecting the occupied or vacant status of one or more SCSI interconnection ports and enables or disables termination, which is applied to the ports without need for manual intervention.

6 Claims, 2 Drawing Sheets

AUTOMATIC SCSI TERMINATION CIRCUIT

FIELD OF THE INVENTION

The present invention relates generally to computer bus interface circuitry. More particularly the invention relates to an automatic termination circuit for use with a Small Computer System Interface (SCSI).

BACKGROUND OF THE INVENTION

The Small Computer System Interface (SCSI) is a parallel input/output bus often used to connect disk drives, CD-ROMs, tape drives and other peripherals to a computer bus. The SCSI bus is a bi-directional multimaster bus which can accommodate peer to peer communications along multiple CPU's and multiple peripherals. Because of its versatility, the SCSI interface has become increasingly important in the microcomputer field.

A SCSI bus must be terminated at both ends of the bus. Consequently, for an SCSI interface controller with multiple ports, it is necessary to determine if that controller constitutes an end of the bus. If the controller does comprise one end of the SCSI bus, then it must be terminated. For example, if a controller has two ports, both of which have devices attached thereby placing the controller in the middle of the bus, then no termination at the controller is required. If however, one port or the other is vacant, then the controller by definition is one end of the SCSI bus therefore requiring termination.

In response to this problem, there have been developed several methods for providing suitable termination of unoccupied SCSI ports. However, all of the methods previously used, involve manual intervention when termination is desired. This manual intervention generally requires an operator to attach a jumper or set of jumpers which enable a termination circuit which prevents the unconnected lines from hindering the SCSI's operation. Then, in order to disable the termination circuit, the jumper or jumpers need to be removed manually by the operator.

Hence, it would be desirable for a SCSI interface to provide for automatic termination to be applied to SCSI ports which are not presently in use. Such automatic termination would increase the ease of use of SCSI ports and corresponding flexibility and versatility, in that when a device was to be connected or disconnected, the operator could simply attach or remove the corresponding device from the SCSI port without need for additional manual intervention with respect to termination enabling or disabling. An automatic termination circuit would also eliminate a source of SCSI malfunction in that the automatic termination circuit would enable or disable termination as necessary and eliminate the possibility of human error.

Finally, an automatic termination circuit would eliminate the need for either resistor packs or jumpers and, therefore, eliminate physical manipulation and increase the useful life of interconnectors.

BRIEF SUMMARY OF THE INVENTION

The apparatus of the present invention provides a means for automatic termination of SCSI interconnectors without the need for manual intervention when termination is to be either enabled or disabled. In practice of the presently preferred embodiment, a signal is detected from the internal SCSI interconnector and an external SCSI interconnector and the absence of a device on either the internal or external SCSI interconnector will enable a termination circuit. The present invention discloses an active termination circuit, however there exist a variety of techniques for both active and passive termination. In the event that a device is detected on both the internal and external SCSI ports, the termination circuit will be disabled.

The present invention generally comprises means for the detection of signals from the external and internal SCSI interconnectors, a logical NOR operation which receives inputs from the detection signals and the output of which is coupled to the enable of either a passive or active termination circuit. In addition, the present invention provides for pull-up resistors in order to bring floating signals to a high level, thus indicating with certainty that a device is not present on the port in question.

BRIEF DESCRIPTION OF THE DRAWINGS

These and other features of the present invention are more fully set forth in the following description of presently preferred embodiments of the invention. The description is presented with reference to the accompanying drawings in which.

DETAILED DESCRIPTION

The present invention provides a circuit for automatic enabling and disabling of termination for SCSI interconnectors. A circuit may be combined with any SCSI device which has interconnectors which during operation may be either connected to another SCSI device or vacant. In a preferred embodiment the circuit is designed to be incorporated into a SCSI Host Bus Adapter.

Figure 1:
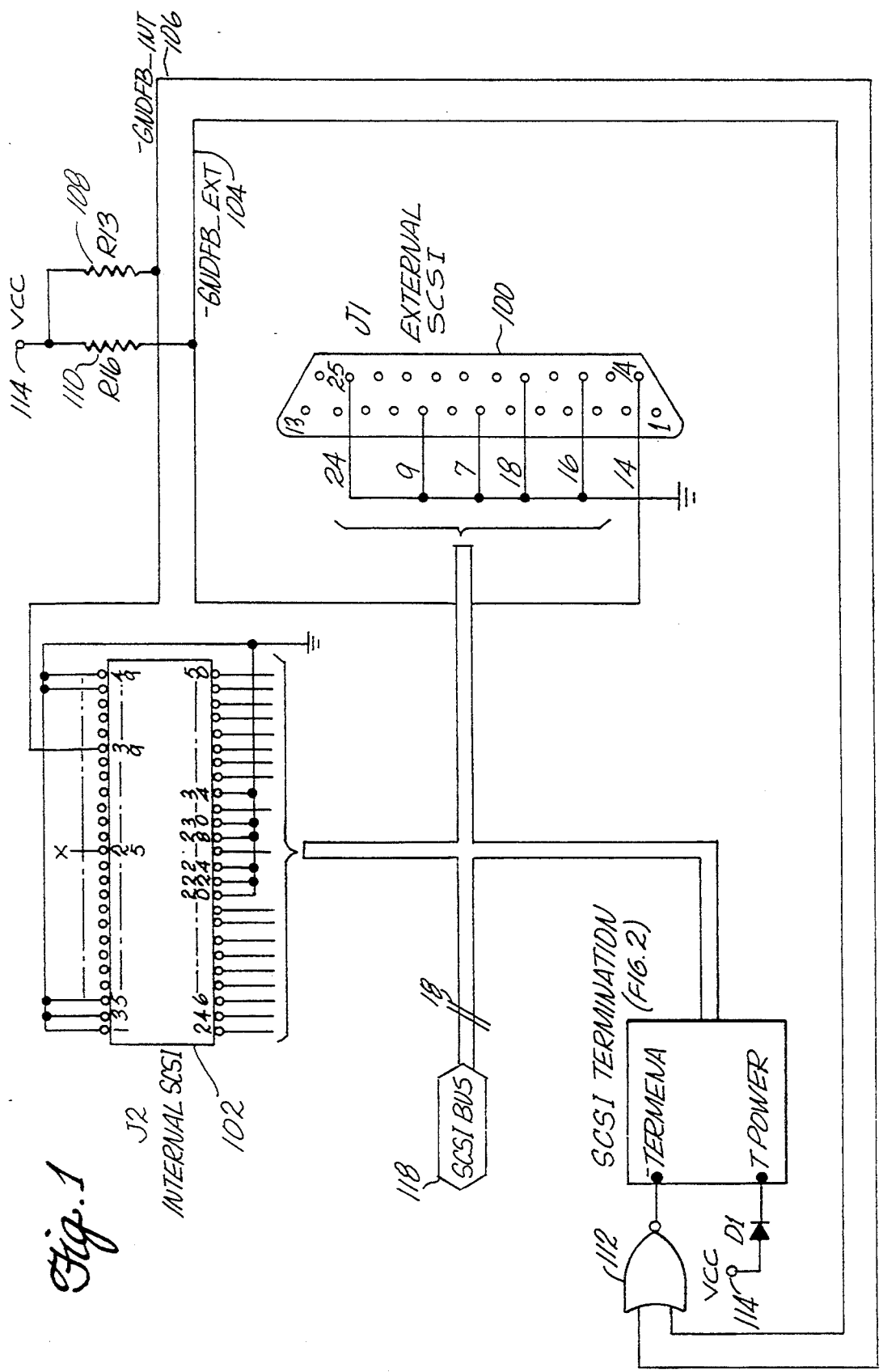
FIG. 1 is a block diagram schematic of a SCSI device detection circuit with comparison apparatus.

Referring to FIG. 1, header J1100 is a SCSI port interconnector designed for connection to an external SCSI device. Although it is depicted as an industry standard DB25 interconnector, it can be implemented in practice by any interconnector suitable for the providing the appropriate number of pins. SCSI port interconnector J2102 is an interconnector designed for coupling the interface to an internal SCSI device. Although it is depicted as a 25×2 interconnector, it may be implemented by any suitable equivalent fashion.

As depicted in FIG. 1 a signal, designated —GND-FB_EXT 104, is extracted from header J1 at pin 14. A signal, designated —GNDFB_INT 106, is extracted from SCSI interconnector J2 at pin 39. These connections are chosen for the presence of ground signals in standard SCSI connections, as will be described in greater detail subsequently. These two ground feedback signals will be at approximately zero volts when a device is detected on either the external or internal SCSI interconnectors. When these signals are not approximately zero volts, and no device is connected to a particular port, one of the two pull-up resistors R13 and R16, 108 and 110, will bring the voltage on the ground feedback line up to approximately the voltage of VCC, thus indicating to the logic of the automatic termination circuit that no device is present on the port in question.

The two ground feedback signals, —GNFDB_EXT and GND_INT are then coupled to two inputs of a logical NOR gate 112. The output from the logical NOR gate is indicated as —TERMENA and provides the appropriate signal to the termination circuit depicted in FIG. 2. Thus, when no device is present on either J1 or J2, termination will be enabled provided by a signal of approximately zero volts on —TERMENA. When there is no device on J1 and there is a device present and detected on J2, termination will also be enabled. When there is a device detected on J1 and there is also no device detected on J2, termination will be enabled. However, when there is a device detected on J1 and there is also a device detected on J2, termination will be disabled, indicated by a logical high signal on —TERMENA.

In addition to the automatic termination aspects as previously described, FIG. 1 depicts the appropriate bus interconnections between the external SCSI interconnector, the internal SCSI interconnector and the SCSI Host Bus Adapter. In the preferred embodiment the external SCSI adapter J1 has the following standard SCSI signals associated with particular pins of the interconnector:—SC7 is connected to pin 13; —SC6 is connected to pin 12;—SC5 is connected to pin 11; —SC4 is connected to pin 23;—SC3 is connected to pin 10; —SC2 is connected to pin 22;—SC1 is connected to pin 21; —SC0 is connected to pin 8;—SPAR is connected to pin 20; —SSEL is connected to pin 19; —SBSY is connected to pin 6; —SACK is connected to pin 5; —SATN is connected to pin 17; —SRST is connected to pin 4; —SIO is connected to pin 3; —SCD is connected to pin 15; —SMSG is connected to pin 2; —SREQ is connected to pin 1; TERMPWR is connected to pin 25; and pins 24, 9, 7, 18, and 16 are connected to ground. These SCSI interconnections are those appropriate for a DB25 industry standard SCSI interconnector, although the appropriate interconnections must be made according to the type of interconnector desired.

The internal SCSI interconnector J2 has the following SCSI interconnections from the SCSI bus connected to the following particular pins of header J2: —SC0 is connected to pin 2; —SC1 is connected to pin 4; —SC2 is connected to pin 6; —SC3 is connected to pin 8; —SC4 is connected to pin 10; —SC5 is connected to pin 12; —SC6 is connected to pin 14; —SC7 is connected to pin 16; —SPAR is connected to pin 18; TERMPWR is connected to pin 26; —SATN is connected to pin 32; —SBSY is connected to pin 36; —SACK is connected to pin 38; —SRST is connected to pin 40; —SMSG is connected to pin 42; —SSEL is connected to pin 44; —SCD is connected to pin 46;—SREQ is connected to pin 48;—SIO is connected to pin 50; pins 1, 3, 5, 7, 9, 11, 13, 15, 17, 19, 20, 21, 22, 23, 24, 27, 28, 29, 30, 31, 33, 34, 35, 37, 41, 43, 45, 47, and 49 are connected to ground.

Figure 2:
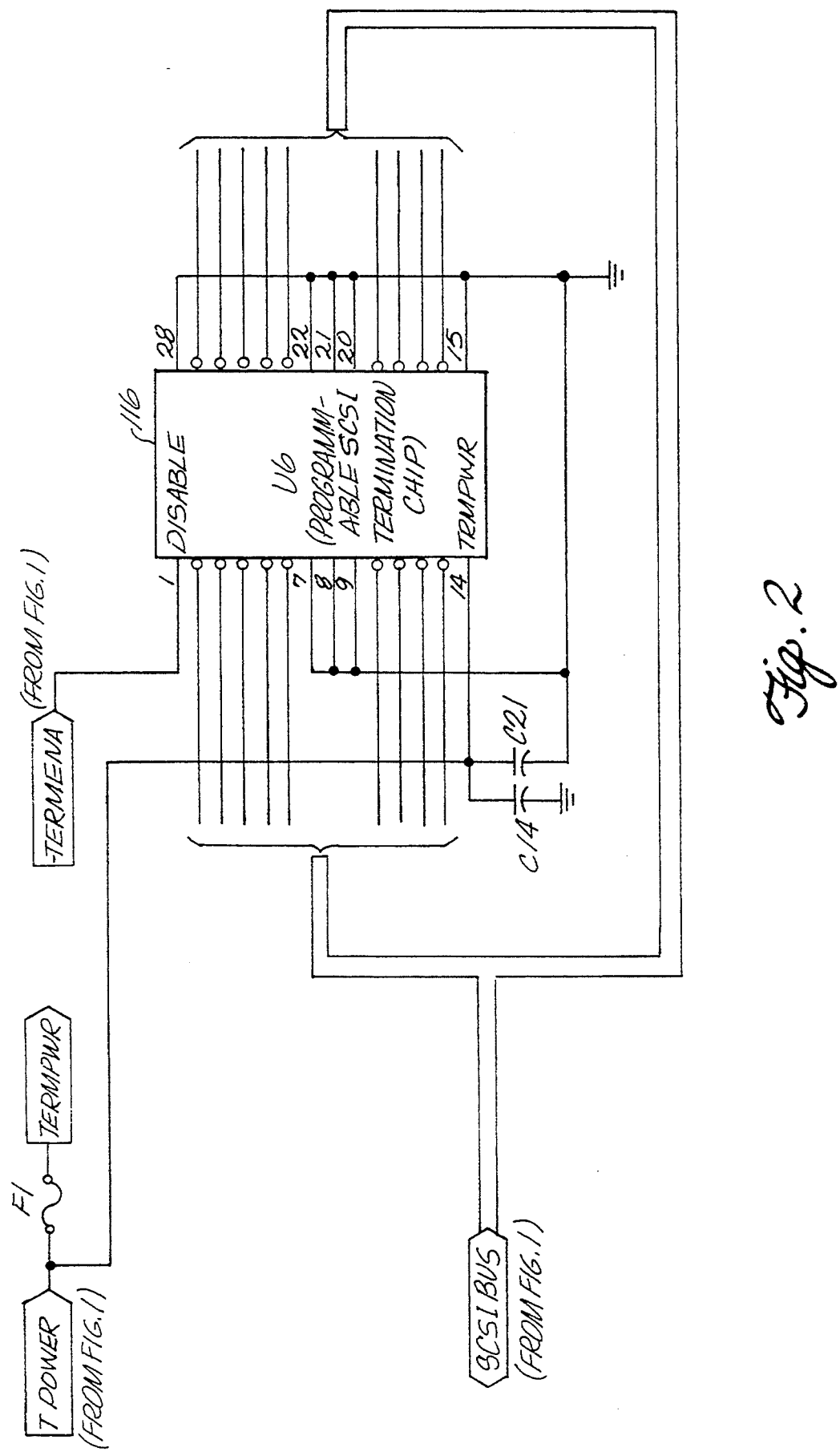
FIG. 2 is a block diagram schematic of an active termination circuit.

In the preferred embodiment a power source VCC 114 is connected through a diode D1, and is designated TPOWER (present on FIG. 1 and FIG. 2). Diode D1 is present to prevent the inadvertent backflow of current from the SCSI termination circuit to the power supply. In the preferred embodiment the diode is provided by part number 1N5817. Also in the preferred embodiment, resistors R13 and R16, are provided by 1 K ohm resistors, however, any value appropriate for a low power pull-up resistor would be appropriate.

In the preferred embodiment the logical NOR operation is provided by a programmable logic array, however, the logical NOR can be achieved through any suitable means including TTL, MOS, or CMOS implementation, or may be controlled by another portion of a relevant circuit capable of performing the requisite logical comparison. Only the logical NOR comparison operation is important to the proper functioning of the automatic termination circuit; any logical signal comparison for the presence of devices on J1 or J2 and providing the appropriate termination enable/disable signal will suffice according to the present invention.

Referring now to FIG. 2, this portion of the circuit provides for an active SCSI termination. Termination power is provided by designated signal TPOWER which is present on FIG. 1 and FIG. 2 and is connected to pin 14 of U6, which is a termination microchip, part number UC5601DW manufactured by Unitrode Corporation and available from Sentar which is located in Irvine, Calif. In FIG. 2, U6 116, is a single chip implementation of a SCSI termination circuit, and is depicted with its pin 1 in the upper left hand corner, the pin numbers increasing downward on the left side, pin 14 in the lower left corner, pin 15 in the lower right corner, with pin numbers increasing to pin 28 in the upper right hand corner.

In the preferred embodiment, the signal —TERMENA is coupled to pin 1 of U6; TPOWER is coupled to pin 14; pins 7, 8, 9, 20, 21, 22, and 28 are coupled to ground. Each of the eighteen SCSI signals are connected to one of the eighteen termination pins of the termination chip. The bus depicted in FIG. 2 contains the same eighteen signals as the bus in FIG. 1. In addition, stabilization capacitance is provided between TPOWER at pin 14 of U6 and ground.

In view of the foregoing description of the preferred embodiment and of the present invention, those skilled in the relevant art will have no difficulty in making changes and modifications in the different described elements of the invention in order to meet their specific requirements, conditions, and needs. For example, as mentioned earlier, the logical operations comparing the presence of devices on J1 and J2 and providing the appropriate enable disable signal to the SCSI termination circuit may be accomplished by any of the previously mentioned logical comparison means as well as any equivalents. In addition, the active termination circuit of FIG. 2 is only the presently preferred embodiment and equivalent means exist for providing SCSI termination with passive components and circuitry and additional SCSI termination methods are presently equivalently known throughout the art. Finally, the same present automatic termination invention may be implemented with any number of SCSI interconnectors with the appropriate logical adaptations as known by those skilled in the art.

What is claimed is:

1. An automatic SCSI termination circuit comprising:
   a plurality of SCSI interconnection ports;
   a plurality of detection lines, equal to the plurality of SCSI interconnection ports, each of said lines coupled to a pin in a corresponding port, said pin normally connected to a grounded pin in a connector mating to said corresponding port;
   a programmable SCSI termination chip having an enable/disable pin;
   a logical NOR gate;
   means for coupling the detection lines to the inputs of the logical NOR gate;

means for coupling the output of the logical NOR gate to the enable/disable pin of the programmable SCSI termination chip;

a signal bus with at least eighteen signal lines;

means for coupling the signal bus to each interconnection port; and means for coupling the signal bus to the programmable SCSI termination chip.

2. An automatic SCSI termination circuit comprising:

at least one SCSI interconnection port;

a signal means for detecting the presence or absence of a SCSI device on said interconnection port; and logical means comprising a programmable logic array for generating a termination enable signal to a SCSI termination circuit when said at least one SCSI interconnection port is vacant.

3. An improved SCSI interface circuit having multiple ports, the improvement comprising:

means for detecting the presence or absence of a SCSI device on any interconnection port;

means for automatically generating an enable/disable signal, comprising a logical comparison between the signals detected on at least two of said interconnection ports; and means for conveying the enable/disable signal to a termination circuit.

4. The automatic termination circuit of claim 2 additionally comprising one or more pull up means for ensuring that said signal means indicate interconnection port vacancy.

5. The automatic termination circuit of claim 4 wherein the pull up means comprise one or more resistors each coupled between each signal means and a voltage source.

6. The automatic termination circuit of claim 2 wherein the signal means comprises a connection to a pin on a SCSI interconnector mating to a normally ground pin on a mating SCSI interconnector.

* * * * *

UNITED STATES PATENT AND TRADEMARK OFFICE
CERTIFICATE OF CORRECTION

PATENT NO. : 5,434,516
DATED : July 18, 1995
INVENTOR(S) : Michael T. Kosco

It is certified that error appears in the above-indentified patent and that said Letters Patent is hereby corrected as shown below:

Column 2, line 5, change "exist" to -- exists --.

Column 2, line 41, change "Jl100" to -- J1100 --.

Column 2, line 45, before "providing" delete "the".

Signed and Sealed this

Fourteenth Day of November, 1995

Attest:

BRUCE LEHMAN

*Attesting Officer*       *Commissioner of Patents and Trademarks*